(12) United States Patent
Magnusson et al.

(10) Patent No.: US 10,837,379 B2
(45) Date of Patent: Nov. 17, 2020

(54) METHOD FOR CONTROLLING AN INTERNAL COMBUSTION ENGINE

(71) Applicant: VOLVO TRUCK CORPORATION, Gothenburg (SE)

(72) Inventors: Ingemar Magnusson, Gothenburg (SE); Arne Andersson, Mölnlycke (SE); Lennart Andersson, Varberg (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 0 days.

(21) Appl. No.: 15/781,130

(22) PCT Filed: Dec. 7, 2015

(86) PCT No.: PCT/EP2015/078862
§ 371 (c)(1),
(2) Date: Jun. 3, 2018

(87) PCT Pub. No.: WO2017/097332
PCT Pub. Date: Jun. 15, 2017

(65) Prior Publication Data
US 2018/0320610 A1 Nov. 8, 2018

(51) Int. Cl.
*F02D 41/00* (2006.01)
*F02D 41/18* (2006.01)
(Continued)

(52) U.S. Cl.
CPC ............ *F02D 41/0027* (2013.01); *F02B 7/06* (2013.01); *F02B 43/10* (2013.01); *F02B 43/12* (2013.01);
(Continued)

(58) Field of Classification Search
CPC ........ F02D 41/00; F02D 41/008; F02D 41/40; F02D 41/403; F02D 41/18; F02D 41/182;
(Continued)

(56) References Cited

U.S. PATENT DOCUMENTS 4,249,374 A * 2/1981 Sugasawa ............... F02D 17/02
123/198 F
4,924,822 A 5/1990 Asai et al.
(Continued)

FOREIGN PATENT DOCUMENTS

CA 2799952 A1 3/2013
CA 2868338 A1 12/2014

OTHER PUBLICATIONS

International Search Report (dated Sep. 19, 2016) for corresponding International App. PCT/EP2015/078862.
WO2014091763A1 (Jun. 19, 2014) Abstract.

*Primary Examiner* — John Kwon
*Assistant Examiner* — Johnny H Hoang
(74) *Attorney, Agent, or Firm* — Venable LLP; Jeffri A. Kaminski

(57) ABSTRACT

A method of controlling an internal combustion engine with a plurality of cylinders includes injecting a first gaseous fuel, at a first pressure, into at least a first cylinder of the cylinders, in a first combustion mode, and simultaneously providing a second gaseous fuel, at a second pressure which is different than the first pressure, for at least a second cylinder of the cylinders, in a second combustion mode which is dissimilar to the first combustion mode, wherein the second cylinder is not the first cylinder.

26 Claims, 5 Drawing Sheets

(51) Int. Cl.
*F02D 41/30* (2006.01)
*F02D 41/40* (2006.01)
*F02M 21/02* (2006.01)
*F02M 43/00* (2006.01)
*F02B 7/06* (2006.01)
*F02B 43/12* (2006.01)
*F02D 19/06* (2006.01)
*F02D 19/02* (2006.01)
*F02B 43/10* (2006.01)
*F02D 41/38* (2006.01)
*F02M 21/06* (2006.01)

(52) U.S. Cl.
CPC ....... *F02D 19/024* (2013.01); *F02D 19/0692* (2013.01); *F02D 41/003* (2013.01); *F02D 41/008* (2013.01); *F02D 41/0025* (2013.01); *F02D 41/182* (2013.01); *F02D 41/3094* (2013.01); *F02D 41/401* (2013.01); *F02D 41/403* (2013.01); *F02M 21/0215* (2013.01); *F02M 21/0224* (2013.01); *F02M 21/0245* (2013.01); *F02M 43/00* (2013.01); *F02B 2043/103* (2013.01); *F02D 2041/389* (2013.01); *F02D 2200/10* (2013.01); *F02M 21/06* (2013.01); *Y02T 10/32* (2013.01); *Y02T 10/36* (2013.01); *Y02T 10/44* (2013.01)

(58) Field of Classification Search
CPC ................. F02D 41/30; F02D 41/3094; F02D 2041/389; F02B 43/10; F02B 43/12; F02M 21/02; F02M 21/0224

USPC .... 123/294–299, 27 GE, 525–527, 575–577; 701/102–104
See application file for complete search history.

(56) References Cited

U.S. PATENT DOCUMENTS

| | | | | |
|---|---|---|---|---|
| 5,890,459 | A * | 4/1999 | Hedrick | F02B 69/02 123/27 GE |
| 7,373,931 | B2 * | 5/2008 | Lennox | F02D 19/0605 123/27 GE |
| 8,364,384 | B2 * | 1/2013 | Pursifull | F02D 41/0027 123/299 |
| 8,516,980 | B2 * | 8/2013 | Leone | F02B 43/12 123/27 GE |
| 8,635,977 | B2 * | 1/2014 | Pursifull | F02D 19/087 123/1 A |
| 8,874,352 | B2 * | 10/2014 | Delpech | F02D 19/0647 123/406.22 |
| 9,026,339 | B1 * | 5/2015 | Sturman | F02B 23/10 123/525 |
| 2004/0118116 | A1 | 6/2004 | Beck et al. | |
| 2012/0325180 | A1 | 12/2012 | Montgomery | |
| 2013/0228151 | A1 | 9/2013 | Dunn et al. | |
| 2013/0255646 | A1 * | 10/2013 | Ulrey | F02D 41/0027 123/527 |
| 2014/0041633 | A1 | 2/2014 | Kim et al. | |
| 2015/0322870 | A1 * | 11/2015 | Ulrey | F02D 41/0027 123/348 |
| 2018/0320607 | A1 * | 11/2018 | Magnusson | F02M 25/12 |
| 2018/0347456 | A1 * | 12/2018 | Magnusson | F02M 43/04 |

* cited by examiner

METHOD FOR CONTROLLING AN INTERNAL COMBUSTION ENGINE

BACKGROUND AND SUMMARY

The invention relates to a method for controlling an internal combustion engine, such as a high pressure gas injection internal combustion engine. The invention also relates to an internal combustion engine system.

The invention can be applied in heavy-duty vehicles, such as trucks, buses and construction equipment, e.g. working machines. The invention can also be applied to cars. Although the invention will be described with respect to a truck, the invention is not restricted to this particular vehicle type.

High Pressure Gas Injection (HPGI) internal combustion engines have been the subject of increasing interest and use for some time. The HPGI technology is also known as the High Pressure Direct Injection (HPDI) technology. It allows natural gas engines to operate at the same efficiency and power as modern heavy-duty diesel engines, but with a better fuel efficiency and reduced greenhouse gas emissions depending on the composition of the gaseous fuel used. The HPGI heavy duty gas engine technology is based on direct in-cylinder injection of gaseous fuel providing conditions for mixing limited combustion, or mixing controlled combustion, similar to the process in conventional diesel engines. The gas is supplied using a special high pressure gas injector. Additional pilot quantities of diesel fuel are injected in order to accomplish ignition.

In internal combustion engines with HPGI, there are usually requirements to dispense of high pressure gas, e.g. during a rapid pressure decrease in the injection system due to a decrease in the engine load, or during an engine stoppage. A need to vent boil-off gas from the liquefied gaseous fuel storage is another common reason for disposing of gas. Such disposal will of course create an environmental disturbance, since it involves emitting unburned hydrocarbons into the atmosphere. In case of methane gas such emissions also cause unwanted contributions to global warming.

CA2868338A1 suggests, for an internal combustion engine with direct gas injection, capturing vented gaseous fuel, storing it in an accumulator, and reintroducing it for engine combustion at a later time. During high load operations of engine, the gaseous fuel from the accumulator is introduced upstream of an air intake compressor and a gas and air premix is thereby added in the cycles in the cylinders before the regular direct gas injection. A problem with this solution is that a large portion, at least 30%, of the captured fuel may not be combusted in the cylinders, and therefore, the relief provided from an environmental point of view is relatively marginal. In addition, said solution gives little possibilities for rapid control of the engine load. Such control is desirable in a vehicle, in which the engine undergoes a large number of load changes during a relatively short span of time.

It is desirable to reduce emissions from fuel systems of internal combustion engines, such as engines with high pressure gas injection.

According to an aspect of the invention, a method of controlling an internal combustion engine with a plurality of cylinders is provided, characterized by injecting a first gaseous fuel, at a first pressure, into at least a first cylinder of the cylinders, in a first combustion mode, and simultaneously providing a second gaseous fuel, at a second pressure which is different than the first pressure, for at least a second cylinder of the cylinders, in a second combustion mode which is dissimilar to the first combustion mode, wherein the second cylinder is not the first cylinder.

The invention is particularly suitable where the engine is a high pressure gas injection internal combustion engine. It should be noted that the step of injecting the first gaseous fuel into at least a first cylinder, may include injecting the first gaseous fuel into one or more of the cylinders, but less than all cylinders. The cylinder, or cylinders, into which the first gaseous fuel is injected are herein also referred to collectively as a first subset of the cylinders. Similarly, the step of simultaneously providing the second gaseous fuel for at least a second cylinder of the cylinders, may include providing the second gaseous fuel for one or more of the cylinders, but less than all cylinders. The cylinder, or cylinders, into which the first gaseous fuel is injected are herein also referred to collectively as a second subset of the cylinders. It should be noted that embodiments of the invention may include deactivation of one or more cylinders.

In embodiments of the invention, the second pressure is lower than the first pressure. The first pressure is preferably relatively high, e.g. as in a typical high pressure gas injection (HPGI) engine. It should be noted that in some embodiments, the pressure of the injections during the first combustion mode may vary, e.g. based on the engine load. Thus, what is herein referred to as the first pressure may vary depending on the operational situation of the engine. In many embodiments, the first pressure is however in any operational situation higher than the second pressure.

Thus, the invention allows for providing the second combustion mode in only a subset of the cylinders, e.g. one of them. This allows for retaining effective and fully controllable high pressure injection combustion cycles in some of the cylinders, while the combustion of the second gaseous fuel may be optimised in the remaining cylinder(s). The method also makes it possible to equip only one or some of the cylinders with hardware for allowing the second combustion mode with the second gaseous fuel, which is in the interest of cost control.

Differing from said CA2868338A1, the invention provides for a considerable reduction in gas vapor emissions, since, where the second fuel is as exemplified below excess gaseous fuel accumulated from the handling of the first gaseous fuel, the invention may provide for combusting substantially all of the second fuel. In a normal HPGI combustion cycle there is, depending on the load, an amount of residual air, i.e. basically only the air entrained in the jet flame will take part in the combustion. Therefore, when introducing as suggested in CA2868338A1 the captured gas in a premix in all cylinders, a part of the premix, i.e. a part of the captured gas, will not be combusted. At low loads, when the HPGI combustion air utilization is relatively small, a substantial part of the premix will pass through the cylinders un-combusted.

Differing from this, since the second fuel is provided only in one, or in a subset of the cylinders, the concentration of the second fuel may be increased, and it is thereby possible to adjust the second combustion mode so as for a considerable higher portion of the second fuel to be combusted. This is particularly useful in a diesel type engine adapted for gaseous fuel, since there is no means to throttle the air provided to the engine. The increased second fuel concentration in the second cylinder(s) may allow for a lambda value for a combustion consuming a major portion of the second fuel, as exemplified below. Thereby, as little as only 2-5% of the second fuel may remain un-combusted as a result of the second combustion mode. Also, the first combustion mode in the first cylinder(s) may be adjusted to optimize the second combustion mode in view of load requirements, as exemplified further below.

Thus, the invention may substantially reduce environmental disturbances caused by excess gaseous fuel in high pressure gas injection engines. Further, the invention may substantially increase the amount of useful work provided by the excess gaseous fuel, due to a higher portion of it being combusted in the engine.

Preferably, as also understood from examples below regarding an advantageous accumulation of the first gaseous fuel, the first gaseous fuel and the second gaseous fuel are of the same type.

Preferably, the step of injecting the first gaseous fuel comprises injecting the first gaseous fuel into a plurality of cylinders of the cylinders. Preferably, the step of simultaneously providing the second gaseous fuel comprises simultaneously providing the second gaseous fuel for only one or two of the cylinders. Thus, in some embodiments, the method comprises providing the second gaseous fuel for only a single cylinder of the cylinders, and, in some embodiments, for only two of the cylinders. Thereby, the low load operation capacity provided by the invention will be further facilitated.

Where a first gas injection system is provided for said step of injecting the first gaseous fuel, the method preferably further comprises accumulating in a container first gaseous fuel from the first gas injection system, and supplying the second gaseous fuel for the second gaseous fuel provision at the second pressure from the container. The first gas injection system may comprise a first container, which may be a liquid natural gas (LNG) tank. Herein, the container in which first gaseous fuel may be accumulated, is also referred to as a second container. The second container, which may be part of a second gas injection system, may be a small low-pressure gas accumulator. The first gaseous fuel from the first gas injection system may be accumulated in the second container. Thereby, emissions from the first gas injection system may be reduced or avoided, thereby reducing the environmental impact of a vehicle in which the engine is operating. It should be noted that the first gas injection system may also comprise a third container in the form of a high pressure buffer tank, whereby the first gaseous fuel may be fed from the first container to the high pressure tank by means of a high pressure pump.

Thus, first gaseous fuel released from an HPGI engine or an LNG tank may be collected in the second container, where it in such embodiments in this presentation changes name to second gaseous fuel. Thereafter it may be on demand efficiently burned in the engine by switching the combustion mode in a subgroup of the cylinders from a HPGI mode to the second combustion mode.

As exemplified below, the accumulation in the second container may be provided as a result of boil-off gas received from the fuel storage tank, or upon transportation from the first gas injection system at a pressure decrease therein or during an engine stoppage. Upon such an accumulation, the gaseous fuel will be at a low pressure, and cannot be utilised as fuel in a normal HPGI combustion mode. Therefore, burning the second gaseous fuel in the second combustion mode in the second cylinder(s) will provide an effective and controllable way to utilise this fuel.

Preferably, the first gaseous fuel is injected at the first pressure into all cylinders in the first combustion mode, and subsequently a shift is made to the step of injecting the first gaseous fuel, at the first pressure, into at least the first cylinder of the cylinders, in a first combustion mode, and the step of simultaneously providing the second gaseous fuel, at the second pressure, for at least the second cylinder of the cylinders, in a second combustion mode. Such embodiments may involve on demand shifting of the combustion mode in the second subset of cylinders to a combustion process that can effectively utilise the low pressure second gaseous fuel.

Preferably, the method comprises determining a load of the engine, and performing said shift in dependence on the determined load. More specifically, the method may involve performing, in dependence on the determined load, the shifting to the step of injecting the first gaseous fuel, at the first pressure, into at least the first cylinder of the cylinders, in a first combustion mode, and the step of simultaneously providing the second gaseous fuel, at the second pressure, for at least the second cylinder of the cylinders, in a second combustion mode. In some embodiments, said shift may be performed on the condition that the load is below a load threshold value. Thereby, a condition suitable for the combustion mode shift may be identified before the shift is performed, and the shift may be avoided when power requirements of the engine provides for using all cylinders for the first combustion mode.

Preferably, the amount of fuel during the second combustion mode is selected to assure optimum conditions in terms of methane oxidation efficiency and safety margin towards knock. This optimum fuel amount may for example correspond to a load in the range of 50-70% of a full load in the second subset of the cylinders.

Preferably, where the method comprises supplying the first gaseous fuel for the first gaseous fuel injection at the first pressure from the first container, the method further comprises supplying the second gaseous fuel for the second gaseous fuel provision at the second pressure from the second container, determining a pressure or a gas content in the second container, and performing said shift in dependence on the determined pressure or gas content in the second container. More specifically, the method may comprise performing, in dependence on the determined pressure or gas content in the second container, the shifting to the step of injecting the first gaseous fuel, at the first pressure, into at least the first cylinder of the cylinders, in a first combustion mode, and the step of simultaneously providing the second gaseous fuel, at the second pressure, for at least the second cylinder of the cylinders, in a second combustion mode. Said shift may be performed on the condition that the pressure or gas content in the second container is above a threshold value. Thereby, the shift may be performed when the accumulation in the second container has reached the capacity of the second container. Also, the shift according to such embodiments may ensure that there is enough second gaseous fuel in the second container to allow the second combustion mode in a controlled manner.

Preferably, the second combustion mode comprises providing the second gaseous fuel at the second pressure for a premix of air and gas to the second cylinder.

Preferably, the second combustion mode comprises
determining a value of an air flow related parameter indicative of an air mass flow into the second cylinder,
determining, based on the determined air flow related parameter value, a value of a fuel flow related parameter indicative of a mass flow of the second gaseous fuel,
providing, in accordance with the determined fuel flow related parameter value, the second gaseous fuel to provide a premix of air and the excess gaseous fuel to the cylinder.

Thereby it is possible to further secure the avoidance of releasing of what is herein also referred to as excess gaseous fuel from the first fuel injection system into the atmosphere, by combusting a major portion of it. More specifically, determining the fuel flow parameter value based on the determined air flow related parameter value provides for a controlled supply of the second gaseous fuel (excess gaseous fuel) for the air and fuel premix which makes it possible to obtain a combustion of the second gaseous fuel which is considerably more complete than in known solutions. The reason is that the fuel flow related parameter value may be determined so as to provide premixed flame propagation in the cylinder, and therefore combustion of a major part of the excess gaseous fuel in the second cylinder. In addition to reducing environmental disturbances caused by excess gaseous fuel, the amount of useful work provided by the excess gaseous fuel may be substantially increased, due to a higher portion of it being combusted in the engine.

Determining the fuel flow related parameter value based on the air flow related parameter value makes it possible to obtain an air to fuel ratio providing a premixed flame propagation even if the engine is not equipped with a throttle for the air. Where there is no throttle, the air flow to the engine will depend largely on the engine rotational speed. Thus, embodiments in the invention provides for adjusting the second gaseous fuel supply to the detected air flow, and thereby secure a premixed flame propagation combustion. I.e., even though the engine is a "diesel type" HPGI engine, which typically has no throttle, an excess gaseous fuel and air pre-mixture may be provided which provides an "Otto type" premixed flame propagation combustion. In some embodiments, the provision of the second gaseous fuel is controlled so as to provide the premix for a load in the cylinder which is kept within an interval of 50-70% of a full load in the cylinder.

The second combustion mode may comprise providing air and the second gaseous fuel at the second pressure for a lambda value of 1.3-1.7, preferably 1.4-1.6, for example approximately 1.5. Thereby, the second combustion mode may have a homogenous gas and air mixture for a combustion consuming substantially all of the gas in the mixture.

Preferably, the method comprises determining a required load on the engine, controlling the provision of the second gaseous fuel so as to provide a substantially constant load in the second cylinder, and simultaneously controlling said injection of the first gaseous fuel so as to provide a total load on the engine corresponding to the required load. Thereby, it is possible, to keep the lambda value in the second cylinder at a substantially constant value, e.g. approximately 1.5, thereby allowing a major part of, or substantially all of the second fuel to be continuously combusted in the second combustion mode. At the same time, changing load requirements on the engine may be met with suitable control of the first combustion mode.

Preferably, the substantially constant load in the second cylinder corresponds to a load in an interval of 50-70%, preferably approximately 65%, of a full load in the second cylinder. Thereby, nearly all of the second fuel may be combusted. At the same time the first combustion mode in the first cylinder(s) may be controlled so as to compensate for any discrepancy between the required load and the constant load in the second cylinder. For example, if the second cylinder is operating in the second mode at 65% of full load, and the required load is 50%, the first combustion mode can be controlled so as to provide less than 50% of full load in the first cylinder(s), so that the total load provided by the engine corresponds to the required load.

Preferably, the second combustion mode comprises a pilot injection of a liquid fuel. Thereby, a dual fuel combustion involving a premix of gas and air, and diesel pilot ignition is provided, which will further improve the control of the combustion process. Preferably, the step of injecting the first gaseous fuel comprises injecting the first gaseous fuel by means of a first injector, and the second combustion mode comprises a pilot injection of the first gaseous fuel by means of the first injector. This is particularly advantageous where the first gaseous fuel, and hence the second gaseous fuel is natural gas. Natural gas puts higher requirements on the ignition system compared to engines fuelled with gasoline, since more energy from the spark is needed. The pilot injection of the first gaseous fuel assists the initiation of the premixed flame propagation combustion of the second combustion mode. This is particularly advantageous since it allows the use of a smaller capacity Diesel pilot injector than required for the total pilot fuel injection of the second combustion mode. More specifically, where the first combustion mode is an HPGI combustion mode, it may require a smaller amount of pilot fuel in each cycle than the second combustion mode. Using in the second combustion mode the first injector for a pilot injection of the first fuel may supplement a pilot injection of Diesel fuel. Thereby, the capacity of the Diesel pilot fuel injector does not need to be sized for the increased pilot fuel requirements of the second combustion mode. Thus, a relatively small capacity Diesel injector may be used, which is in the interest of cost control. It should be noted however, that in alternative embodiments, no first gaseous fuel is injected into the cylinder in the second combustion mode.

For further combustion control improvements, the method may comprise determining an air to gas ratio in the second combustion mode, and controlling said pilot injection in dependence on the determined air to gas ratio.

According to another aspect of the invention, an internal combustion engine system is provided comprising an internal combustion engine with a plurality of cylinders, an air intake system presenting for each cylinder an air conduit dedicated only for the respective cylinder, a first gas injection system for injecting a first gaseous fuel into the cylinders at first pressure, a second gas injection system for providing a second gaseous fuel to the engine at a second pressure which is different than the first pressure, the first gas injection system comprising a first container for the first gaseous fuel to be injected by the first gas injection system, the second gas injection system comprising a second container for the second gaseous fuel to be provided by the second gas injection system, characterized in that the second gas injection system is arranged to provide the second gaseous fuel directly into one or more of the cylinders or directly to one or more of the air conduits dedicated only for the respective cylinder.

This aspect of the invention is particularly useful where the engine is a high pressure gas injection internal combustion engine. The aspect provides the first gas injection system for injecting the first gaseous fuel into the cylinders at the first pressure, and preferably all cylinders are adapted to be fed by the first gaseous fuel, e.g. by high pressure gas injection (HPGI) injectors.

The air intake system air conduit dedicated for the respective cylinder is also referred to as an intake port. The second gas injection system being arranged to provide the second gaseous fuel directly into one or more of the cylinders or directly to one or more of the air conduits dedicated only for the respective cylinder, allows for supplying the second gaseous fuel to a selected subgroup of the cylinders only. In turn, this allows running the cylinder(s) in this subgroup, herein also referred to as the second subgroup, on low load and on the second gaseous fuel only. As discussed above, this provides for an improved control when emptying of the accumulator tank.

Further advantages and advantageous features of the invention are disclosed in the following description.

BRIEF DESCRIPTION OF THE DRAWINGS

With reference to the appended drawings, below follows a more detailed description of embodiments of the invention cited as examples. In the drawings.

DETAILED DESCRIPTION

Figure 1:
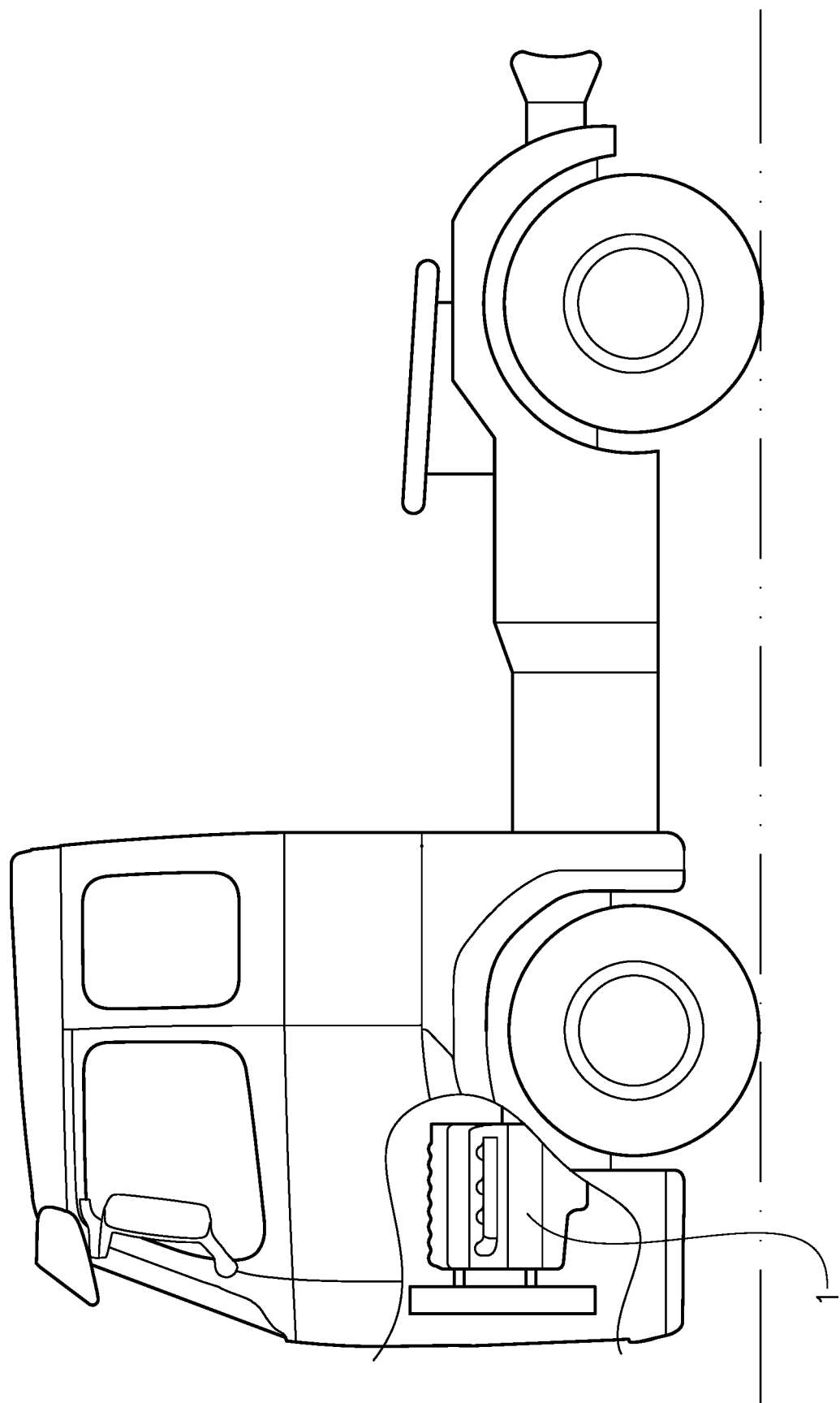
FIG. 1 is a partially sectioned side view of a vehicle in the form of a truck.

FIG. 1 shows a vehicle in the form of a truck, or a tractor for a semitrailer. It should be noted that the vehicle can be of a variety of alternative types, e.g. it may be a car, a bus, or a working machine such as a wheel loader. The vehicle comprises an engine system with a high pressure gas injection (HPG) internal combustion engine 1.

Figure 2:
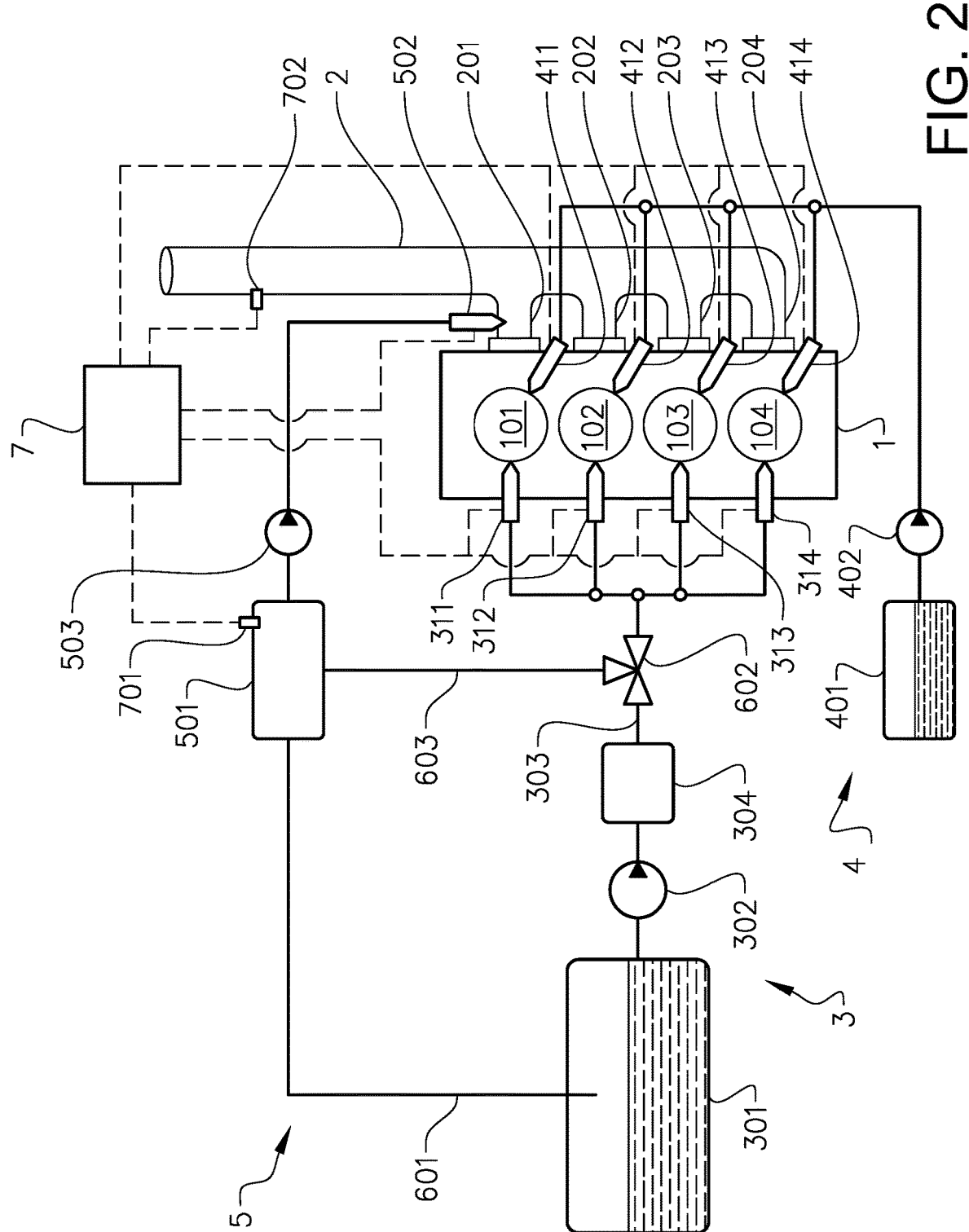
FIG. 2 is a diagram of an engine system in the vehicle in FIG. 1.

FIG. 2 depicts components of the engine system including the engine 1 which has four cylinders 101-104. The engine system comprises an air intake system 2 for the engine 1. The air intake system 2 presents for each cylinder 101-104 an air conduit 201-204 dedicated for a respective of the cylinders 101-104.

The engine system also comprises a first gas injection system 3 for injecting a first gaseous fuel into the cylinders 101-104 at a first pressure. Any suitable type of gaseous fuel may be used; in this example the first gaseous fuel is natural gas comprising methane. Other possible gases include propane and butane. The first gas injection system 3 comprises a first container 301 for the first gaseous fuel to be injected by the first gas injection system 3. The first container 301 is a liquid natural gas (LNG) tank. The first gas injection system 3 further comprises a high pressure injector 311-314 at each cylinder 101-104. The first gas injection system 3 further comprises, between the first container 301 and the high pressure injectors 311-314, a high pressure pump 302. The first gas injection system 3 also comprises an evaporator (not shown). Thus, the high pressure pump 302 is arranged to provide the first gaseous fuel from the first container 301 to the high pressure injectors 311-314, via a high pressure buffer tank 304, herein also referred to as a third container, and a high pressure fuel conduit 303.

It should be noted that the high pressure injectors 311-314 are arranged to change the fuel injection pressure, e.g. based on the engine load. Thus, what is herein referred to as the first pressure may vary depending on the operational situation of the engine.

The engine system also comprises a pilot fuel system 4 for injecting a pilot fuel into the cylinders 101-104. Any suitable type of pilot fuel may be used; in this example the pilot fuel is diesel. In alternative embodiments, the pilot fuel may be dimethyl ester (DME). The pilot fuel system 4 comprises a pilot fuel tank 401 and a pilot fuel injector 411-414 at each cylinder 101-104. The pilot fuel system 4 further comprises, between the pilot fuel tank 401 and the pilot fuel injectors 411-414, a pilot fuel pump 402. Thus, the pilot fuel pump 402 is arranged to provide the pilot fuel from the pilot fuel tank 401 to the pilot fuel injectors 411-414. It should be noted that in each cylinder 101-104 the respective high pressure injector 311-314 and pilot fuel injector 411-414 may be provided as separate units, or combined in a single combination injector, as is known per se.

In accordance with this embodiment of the invention, the engine system comprises a second gas injection system 5 for providing a second gaseous fuel to the engine 1 at a second pressure which is lower than the first pressure, at which the first gaseous fuel is injected. The second gaseous fuel is excess gaseous fuel from the first gas injection system 3, and is accumulated as exemplified below. The second gas injection system 5 comprises an injector 502, herein also referred to as a low pressure injector 502, arranged to inject fuel into one of the air conduits 201.

In other embodiments, a low pressure injector 502 may be arranged to inject fuel into a respective of a plurality of the air conduits 201-204, which could be less than all, or all of the conduits 201-204. In further embodiments, a low pressure injector 502 could be arranged to inject the second gaseous fuel directly into a respective of one or more of the cylinders 101-104.

The second gas injection system 5 comprises a second container 501 for the second gaseous fuel. The second gas injection system 5 further comprises, between the second container 501 and the low pressure injector 502, a low pressure fuel pump 503. Thus, the low pressure pump 503 is arranged to provide the second gaseous fuel from the second container 501 to the low pressure injector 502. It should be noted that in some embodiments, the pressure in the second container 501 may be such that no low pressure pump 503 needs to be provided. Instead a pressure regulator or a valve may be arranged to control the pressure at the low pressure injector 502. In further embodiments, no pump, pressure regulator or valve is provided between the second container 501 and the low pressure injector 502.

The low pressure injector 502 pressure is arranged to control, as exemplified below, a supply of the second gaseous fuel based on signals from a pressure sensor 701 in the second container 501, and in accordance with determined values of a fuel flow related parameter in the form of a flow of the second gaseous fuel.

In accordance with this embodiment of the invention, the second container 501 is arranged to accumulate first gaseous fuel from the first container 301. Thus, the first gaseous fuel and the second gaseous fuel are in this embodiment of the same type. The first gaseous fuel accumulated in the second container 501 is herein also referred to as second gaseous fuel, or excess gaseous fuel, from the first gas injection system 3. The transport of gaseous fuel from the first container 301 to the second container 501, whereby it in this presentation of this embodiment changes its name from the first gaseous fuel to the second gaseous fuel or to the excess gaseous fuel, may occur in at least three ways:

a) Boil-off gas from the first container; i.e. when the temperature of the first gaseous fuel increases resulting increased saturated gas pressure. The first gaseous fuel forming boil-off gas is transported from the first container 301 to the second container 501 via a boil-off conduit 601.

b) When gas injection pressure in the first gas injection system 3 is decreased during operation of the engine, e.g. due to a decrease in the engine load, the first gaseous fuel in the high pressure fuel conduit 303 is transported via a relief valve 602 in the high pressure fuel conduit 303, and a relief conduit 603, to the second container 501. The release valve 602 is adapted to adjust its setting based on an actual injection pressure exceeding a desired injection pressure. When there is an excess of pressure in the high pressure fuel conduit 303, the release valve 602 will open a connection between the high pressure fuel conduit 303 and the relief conduit 603.

c) When the engine is stopped, the high pressure fuel conduit 303 is emptied from the first gaseous fuel, which is transported via the relief valve 602 in the high pressure fuel conduit 303, and the relief conduit 603, to the second container 501.

The engine system further comprises a control unit 7 which is arranged to control the high pressure injectors 311-314 individually, to control the pilot fuel injectors 411-414 individually, and to control the low pressure injector 502. The control unit 7 is further arranged to receive signals from a pressure sensor 701 in the second container 501 to determine the pressure therein.

The control unit 7 is also arranged to receive signals from a mass air flow (MAF) sensor 702, located in the intake system 2, upstream of the air conduits 201-204. The control unit is arranged to determine based in the signals from the MAF sensor 702 values of an air flow related parameter in the form of the air mass flow to the cylinders 101-104.

It should be noted that in alternative embodiments, the air flow related parameter may be some other parameter, which is nevertheless indicative of the air mass flow into the cylinders 101-104. For example, the air flow related parameter may be the pressure in the intake system 2, determined by means of a manifold absolute pressure (MAP) sensor.

As exemplified below, the control unit 7 is arranged to determine, based on the determined air mass flow, values of the flow of the second gaseous fuel. The control unit 7 is further arranged to control the low pressure injector 502 so as to supply from the second container 501, in accordance with the determined values of the second gaseous fuel flow, the second gaseous fuel to provide a premix of air and the second gaseous fuel to the cylinder 101.

In addition, the control unit 7 is arranged to determine the load of the engine during its operation in the vehicle, as is known per se, e.g. based on signals from the MAF sensor 702, and/or an accelerator pedal position (APP) sensor, (not shown).

Figure 3:
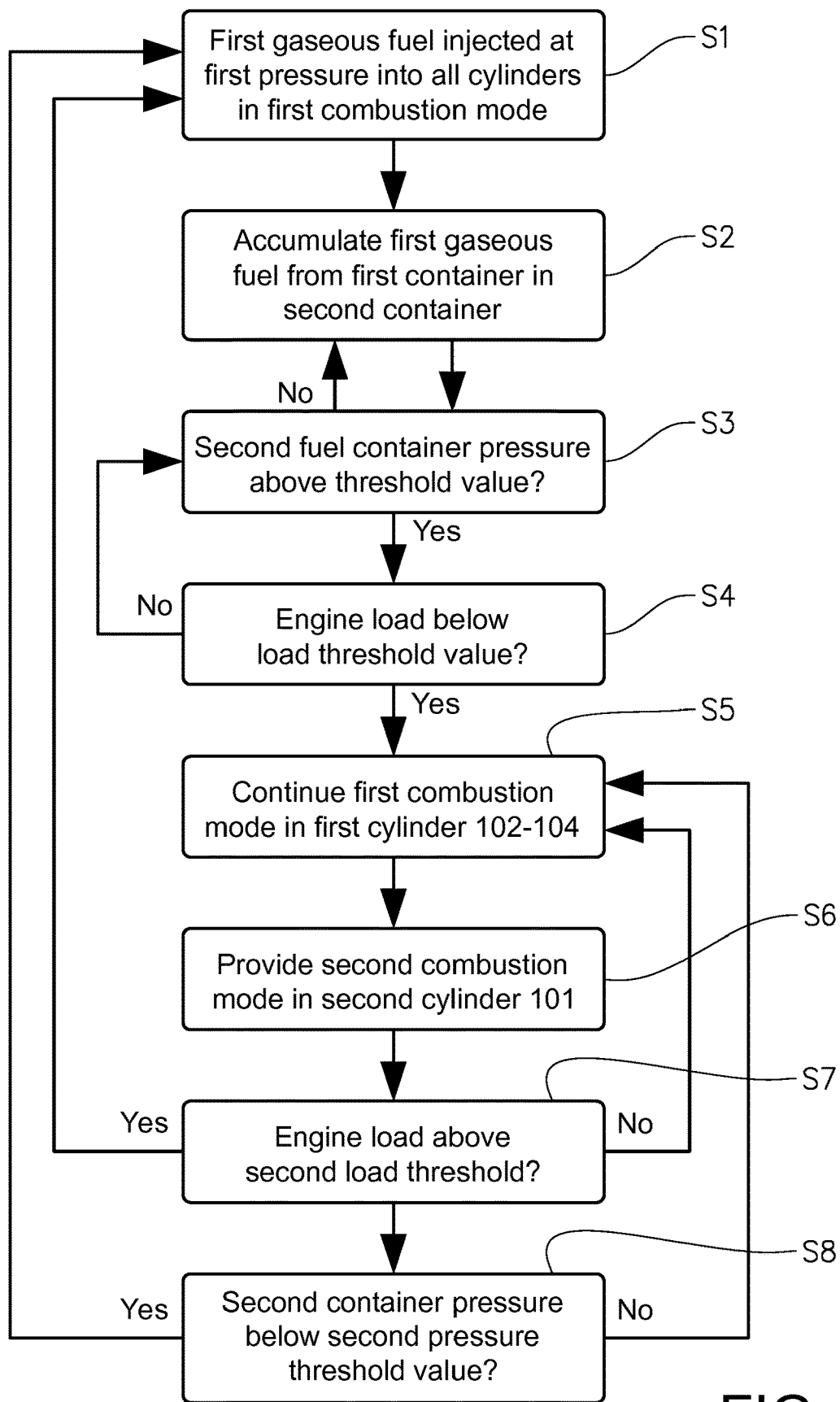
FIG. 3 and FIG. 4 are flow diagrams depicting steps in a method in the engine system in FIG. 2.
Figure 4:
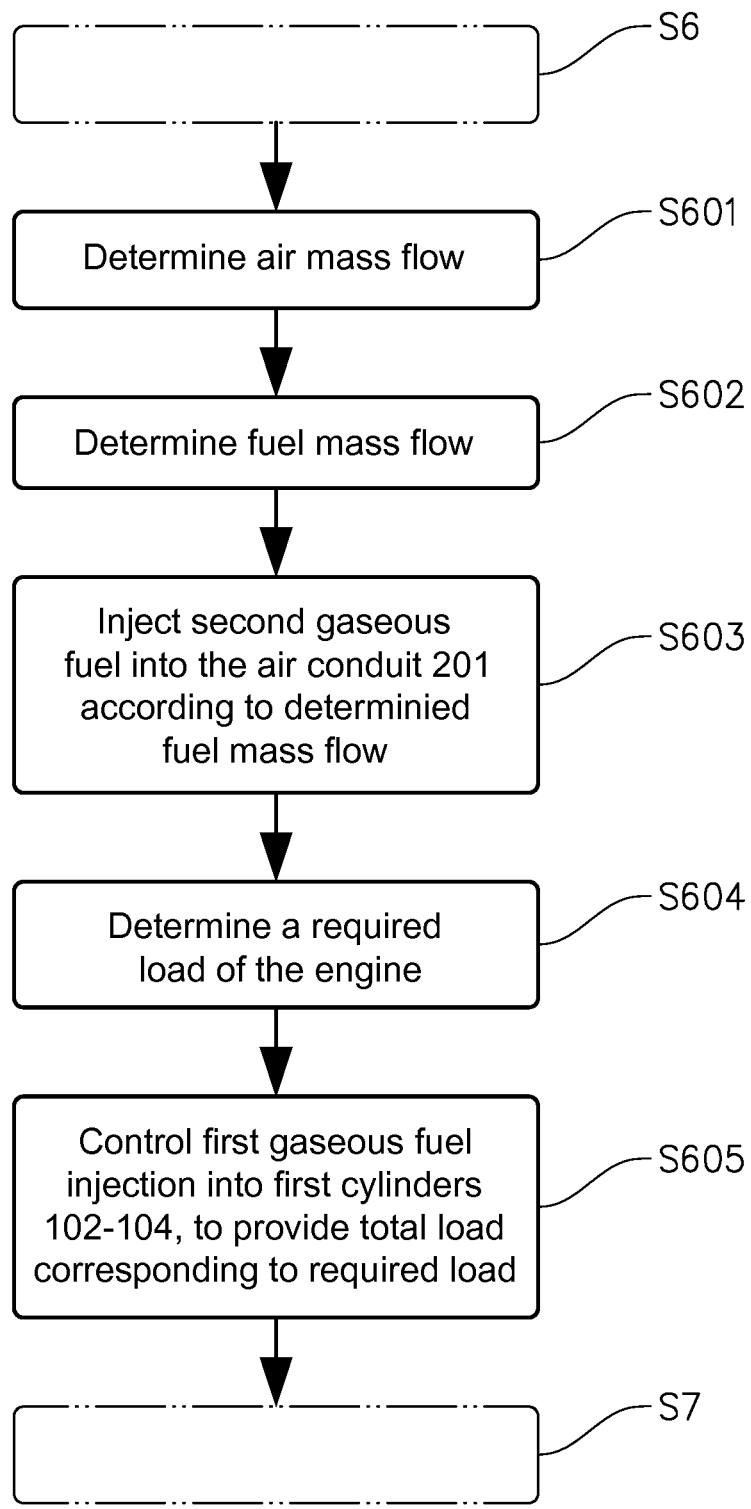

With reference to FIG. 3 and FIG. 4, a method according to an embodiment of the invention will be described.

As a starting point in this example, the engine 1 is operating with all cylinders in the same combustion mode, herein referred to as the first combustion mode. Thereby, the first gaseous fuel is injected S1 at a first pressure into all cylinders 101-104. Thereby, the high pressure injectors 311-314 and the pilot fuel injectors 411-414 at all cylinders are controlled for main injections of the first gaseous fuel from the first container 301 and pilot fuel injections for auto-ignition of diesel fuel. Thereby the first gaseous fuel is combusted in a process similar to that of combustion with diesel fuel only.

While the engine is operating with all cylinders in the first combustion mode, first gaseous fuel from the first container 301 is accumulated S2 in the second container 501, for example as mentioned above, i.e. (a) as boil-off gas received via the boil-off conduit 601, or (b or c) transported via the relief valve 602 and the relief conduit 603 at a first gas injection system pressure decrease or during a temporary engine stoppage.

Also, while the engine is operating with all cylinders in the first combustion mode, the pressure in the second fuel container 501 is continuously monitored by the control unit 7 by means of the pressure sensor 701. The control unit 7 determines S3 whether the second fuel container pressure is above a threshold value, herein also referred to as a first pressure threshold value. If the second fuel container pressure is above the first pressure threshold value, the control unit 7 determines S4 whether the load of the engine is below a load threshold value, herein also referred to as a first load threshold value.

If the second container pressure is above the first pressure threshold value, and the load is below the first load threshold value, the first combustion mode as described above is continued S5 in a first subset of the cylinders, herein also referred to as first cylinders 102-104. However, in one of the cylinders, herein referred to as the second cylinder 101, the first combustion mode is replaced S6 by a second combustion mode.

Reference is made to FIG. 4 showing steps in the control of the first and second combustion modes. When the second combustion mode is introduced in the second cylinder 101, the second gaseous fuel stored in the second fuel container 501 is pumped to the low pressure injector 502, from which it is provided to the air conduit 201 leading to the second cylinder 101. The low pressure injector 502 injects the second gaseous fuel at the second pressure which is as stated lower than the first pressure by which the first gaseous fuel is injected. The low pressure injector 502 is controlled to control the flow of the injected second gaseous fuel as follows:

The control unit 7 determines S601 based on signals from the MAF sensor 702 a value of the air mass flow. Based on the determined air mass flow, the control unit determines S602 a value of the mass flow of the second gaseous fuel. The fuel mass flow is chosen so as to provide a premix with a lambda value of approximately 1.5. The control unit 7 then controls the low pressure injector 502 so as to supply S603 from the second container 501 the second gaseous fuel by injecting at the determined fuel mass flow value the second gaseous fuel into the air conduit 201 leading to the second cylinder 101. This will provide the premix of air and the second gaseous fuel to the second cylinder 101. The lambda value of approximately 1.5 will provide a premixed flame propagation combustion in the second cylinder 101, resulting in a major part of the second gaseous fuel being combusted.

To keep the lambda value constant in view of a fluctuating air mass flow, the steps of determining S601 the air mass flow, and determining S602 the second gaseous fuel mass flow are continuously repeated. As a result of the engine being un-throttled, if the engine rotational speed is within a range normally provided during non-transient conditions giving a steady air mass flow, said premix control will in this example provide in a constan load in the second cylinder 101 corresponding to approximately 65% of the full load in the second cylinder.

Since the load provided by the second cylinder 101 is substantially constant, the following steps are carried out to compensate for any discrepancy between the required load on the engine and the share of the engine load provided by the second cylinder. The control unit 7 determines S604 a required load of the engine, and controls S605 the injection, in the first combustion mode, of the first gaseous fuel into the first cylinders 102-104 so as to provide a total load of the engine corresponding to the required load.

For example, where the second cylinder 101 is operating in the second mode providing a substantially constant load of 65% of full load, and the required load is 50%, the first combustion mode is controlled so as to provide less than 50% of full load in the first cylinders 102-104, so that the total load provided by the engine corresponds to the required load.

Figure 5:
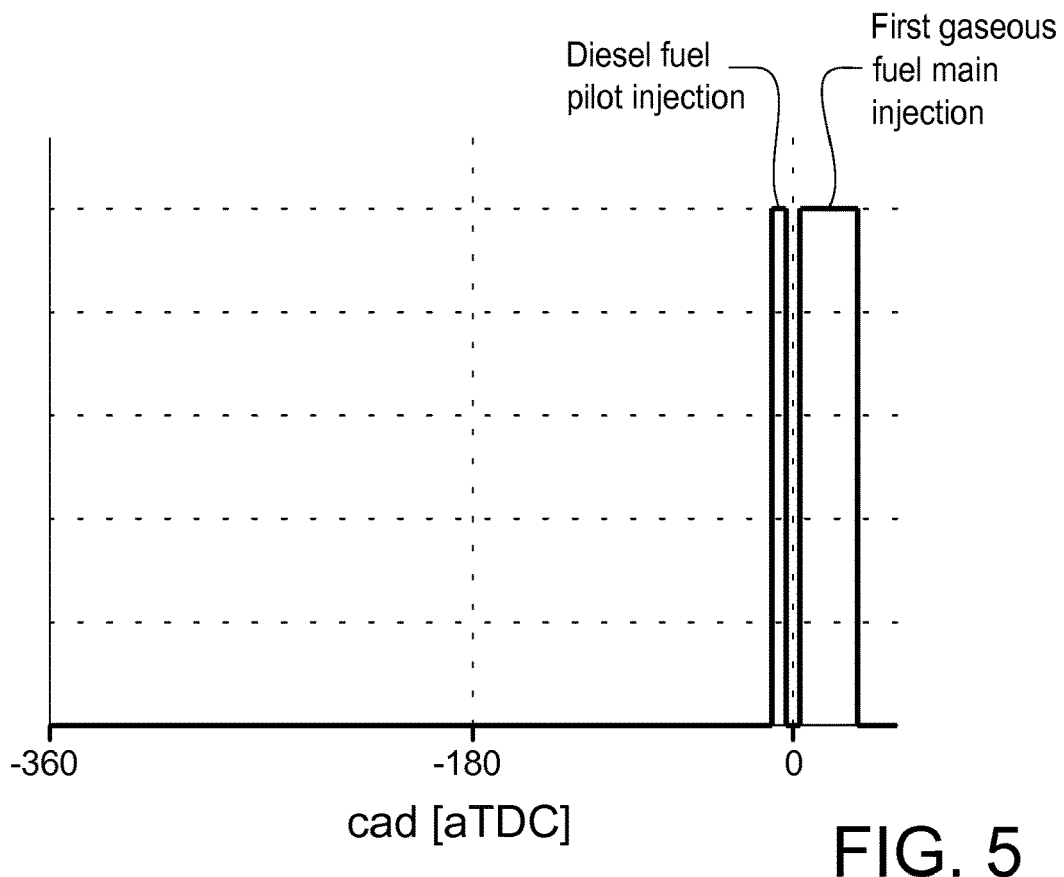
FIG. 5 and FIG. 6 show diagrams depicting fuel injections in combustion modes provided by the method in FIG. 3 and FIG. 4, as functions of the crankshaft angle.

FIG. 5 shows a diagram depicting fuel injections in the first combustion mode as a function of the crankshaft angle (CAD) of the first cylinders 102-104. This combustion mode is known per se as a HPGI combustion mode. It involves the a pilot injection by means of the pilot fuel injectors 412-414 in the first cylinders 102-104 of diesel fuel, at the end of the compression stroke, close to the top dead centre (TDC) position. A main injection of the first gaseous fuel by means of the high pressure injectors 312-314 in the first cylinders 102-104 is provided at the beginning of the expansion stroke.

Figure 6:
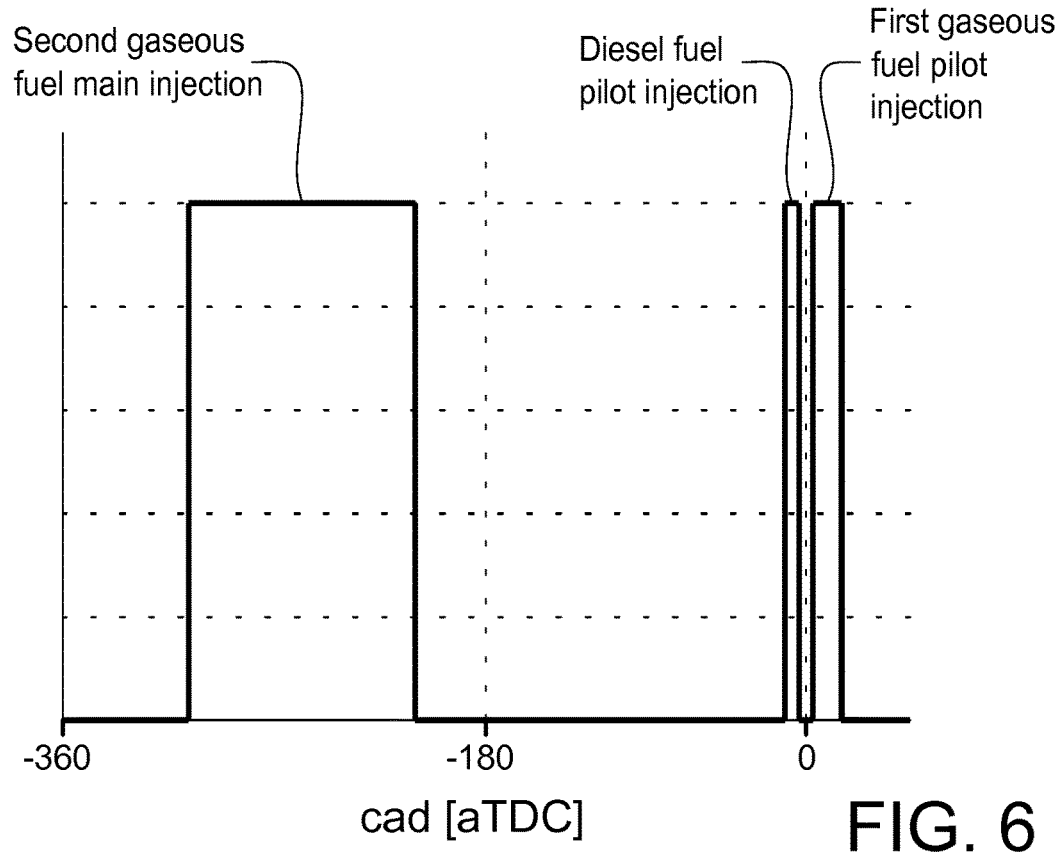

FIG. 6 shows a diagram depicting fuel injections in the second combustion mode as a function of the crankshaft angle of the second cylinder 101. The second gaseous fuel is injected well into the air conduit 201 leading to the second cylinder 101 at the end of an induction stroke of the second cylinder 101. Thereby the excess gaseous fuel is injected early enough for the air and fuel premix to be introduced to the second cylinder 101 and homogenously mixed. As mentioned, the low pressure injector 502 may be alternatively arranged to inject fuel directly into the second cylinder 101. Also, alternatively, the second fuel may be injected at the beginning of the compression stroke of the cylinder.

Further, a pilot injection of diesel fuel is provided by means of the pilot fuel injector 411 in the second cylinder 101, at the end of the compression stroke. In addition, a pilot injection of the first gaseous fuel by means of the high pressure injector 311 in the second cylinder 101 is provided at the beginning of the expansion stroke. The pilot injections auto-ignite and provides thereby an initiation of the premixed flame propagation combustion of the air fuel premix. The additional pilot injection of first gaseous fuel provides additional energy needed to ignite the air and fuel premix, compared to the ignition energy needed in the first combustion mode.

During the compression stroke in the second combustion mode, the pressure and temperature of the premixed charge is increased, however, not to levels at which a premature auto-ignition would occur. Instead ignition is accomplished by the pilot injections and auto-ignition of the diesel fuel and the first gaseous fuel. It should be noted that the pilot injections, e.g. the amount of pilot fuel injected in each cycle, is controlled in dependence on the determined ratio of air to second gaseous fuel, as discussed above. The premixed second gaseous fuel and air charge is subsequently combusted mainly in a controlled flame propagation process.

It should be noted that during the dual combustion mode operation of the engine, the first gaseous fuel injection in the first cylinders 102-104 is controlled, in addition to the engine load control as exemplified above, so as to optimise the ignition events for the dual fuel operation. More specifically, the amount of first gaseous fuel during the dual combustion mode operation is controlled to assure optimum conditions in terms of power efficiency, methane oxidation efficiency and safety margins towards knock.

If during the dual combustion mode the load of the engine is increased above a second load threshold value, the combustion mode in the second cylinder 101 is shifted S7 from the second combustion mode back to the first combustion mode, so that all cylinders are operating with the high pressure first gaseous fuel injections. Thereby, a priority can be given to power requirements during certain vehicle operational situations.

When the pressure in the second container 501 has degreased below a second threshold S8, the combustion mode in the second cylinder 101 is shifted from the second combustion mode back to the first combustion mode. Thereby, when a major portion of, or all of, the gaseous fuel collected in the second container 501 has been burned off in the second cylinder 101, all cylinders will again be operating in the first combustion mode.

Thus, since the second container 501 is arranged to accumulate first gaseous fuel from the first container 301 as described, emissions of the first gaseous fuel from the first gas injection system 3 may be avoided, thereby reducing the environmental impact of the vehicle. It should be noted that the size of the second container 501 may be small in relation to the first container 301. In some embodiments, providing the second container 501 in the form of a pipe could suffice. The size of the second container should however, be sufficient for allow the second combustion mode with the air to fuel ratio as exemplified above. Also, the size of the second container should be large enough to receive all gaseous fuel when the engine is stopped as described above. Since the pressure in the second container 301, e.g. 10-15 bar, is lower that the pressure in the third container 304, a reduced strength of the second container 501 is allowed.

Several alternative combustion processes for the second combustion mode could be considered. In alternative embodiments, the second combustion mode may comprise a homogenous charge compression ignition (HCCI) of the second gaseous fuel provided at the second pressure. In such a case, no pilot fuel injection would be required in the second combustion mode. Suitably, where the second combustion mode involves HCCI, the supply of the second gaseous fuel based on the air mass flow is controlled so as to provide a lambda value of the premix charge of 2.0-2.5.

It is to be understood that the present invention is not limited to the embodiments described above and illustrated in the drawings; rather, the skilled person will recognize that many changes and modifications may be made within the scope of the appended claims.

The invention claimed is:

1. A method of controlling an internal combustion engine with a plurality of cylinders, the method comprising:
    injecting a first gaseous fuel from a first gas injection system, at a first pressure, into at least one first cylinder of the plurality of cylinders, in a first combustion mode,
    accumulating in a container a second gaseous fuel, wherein the second gaseous fuel comprises an excess of the first gaseous fuel, and
    simultaneously with injecting the first gaseous fuel, providing the second gaseous fuel from the container, at a second pressure which is different than the first pressure, for at least one second cylinder of the plurality of cylinders, in a second combustion mode which is dissimilar to the first combustion mode,
    wherein the at least one second cylinder is not the at least one first cylinder, and wherein the step of simultaneously providing the second gaseous fuel for at least one second cylinder of the plurality of cylinders, includes providing the second gaseous fuel for one or more of the plurality of cylinders, but less than all of the cylinders.

2. A method according to claim 1, wherein the first gaseous fuel and the second gaseous fuel are of the same type.

3. A method, according to claim 1, wherein the step of injecting the first gaseous fuel comprises injecting the first gaseous fuel into more than one of the plurality of cylinders.

4. A method according to claim 1, wherein the step of simultaneously providing the second gaseous fuel comprises simultaneously providing the second gaseous fuel for only a single cylinder of the cylinders.

5. A method according to claim 1, further comprising:
injecting the first gaseous fuel at the first pressure into all cylinders in the first combustion mode, and
subsequently shifting to the step of injecting the first gaseous fuel, at the first pressure, into at least the first cylinder of the cylinders, in the first combustion mode, and the step of simultaneously providing the second gaseous fuel, at the second pressure, for at least the second cylinder of the cylinders, in the second combustion mode.

6. A method according to claim 5, further comprising determining a load of the engine, and performing the step of shifting in dependence on the determined load.

7. A method according to claim 5, further comprising determining a load of the engine, and performing the step of shifting on the condition that the load is below a load threshold value.

8. A method according to claim 5, wherein the container is a second container, and the method further comprising:
supplying the first gaseous fuel for the first gaseous fuel injection at the first pressure from a first container,
supplying the second gaseous fuel for the second gaseous fuel provision at the second pressure from the second container,
determining a pressure or a gas content in the second container, and
performing the step of shifting in dependence on the determined pressure or gas content in the second container.

9. A method according to claim 8, further comprising performing the step of shifting on the condition that the pressure or gas content in the second container is above a threshold value.

10. A method according to claim 1, wherein the second combustion mode comprises providing the second gaseous fuel at the second pressure for a premix of air and gas to the at least one second cylinder.

11. A method according to claim 1, wherein the second combustion mode comprises
determining a value of an air flow related parameter indicative of an air mass flow into the second cylinder,
determining, based on the determined air flow related parameter value, a value of a fuel flow related parameter indicative of a mass flow of the second gaseous fuel, and
providing, in accordance with the determined fuel flow related parameter value, the second gaseous fuel to provide a premix of air and the second gaseous fuel to the second cylinder.

12. A method according to claim 1, wherein the second combustion mode comprises providing air and the second gaseous fuel at the second pressure for a lambda value of 1.3-1.7.

13. A method according to claim 1, further comprising determining a required load on the engine, and controlling the injection of the first gaseous fuel so as to provide a total load on the engine corresponding to the required load.

14. A method according to claim 13, wherein a substantially constant load in the second cylinder corresponds to a load in an interval of 50-70% of a full load in the second cylinder.

15. A method according to claim 1, wherein the second combustion mode comprises a pilot injection of a liquid fuel.

16. A method according to claim 1, wherein the step of injecting the first gaseous fuel comprises injecting the first gaseous fuel by means of a first injector, and the second combustion mode comprises a pilot injection of the first gaseous fuel by means of the first injector.

17. A method according to claim 15, further comprising determining an air to gas ratio in the second combustion mode, and controlling the pilot injection in dependence on the determined air to gas ratio.

18. A method according to claim 1, wherein the second combustion mode comprises a homogenous charge compression ignition (HCCI) of the second gaseous fuel provided at the second pressure.

19. A method according to claim 1, wherein the second combustion mode involves injecting only the second gaseous fuel at the second pressure.

20. A computer comprising a computer program for performing the steps of claim 1 when the program is run on the computer.

21. A non-transitory computer readable medium carrying a computer program for performing the steps of claim 1 when the program is run on a computer.

22. A control unit arranged to perform the steps of the method according to claim 1.

23. An internal combustion engine system comprising
an internal combustion engine with a plurality of cylinders,
an air intake system presenting for each cylinder an air conduit dedicated only for the respective cylinder,
a first gas injection system for injecting a first gaseous fuel into the plurality of cylinders at a first pressure,
a second gas injection system for providing a second gaseous fuel to the engine at a second pressure which is different than the first pressure, and
a control unit coupled to and configured for controlling the internal combustion engine, the air intake system, the first gas injection system, and the second gas injection system,
wherein the first gas injection system comprises a first container for the first gaseous fuel to be injected by the first gas injection system,
wherein the second gas injection system comprises a second container for the second gaseous fuel to be provided by the second gas injection system,
wherein the second container is arranged to accumulate first gaseous fuel from the first container, and
wherein the second gas injection system is arranged to provide the second gaseous fuel directly into one or more of the plurality of cylinders or directly to one or more of the air conduits dedicated only for the respective cylinder, allowing for supplying the second gaseous fuel to a selected subgroup of the plurality of cylinders only.

24. A system according to claim 23, wherein the first gaseous fuel and the second gaseous fuel are of the same type.

25. A system according to claim 23, wherein the second gas injection system comprises at least one injector arranged to inject the second gaseous fuel into a respective one of the at least one of the air conduits.

26. A system according to claim 23, wherein the first container is a liquid natural gas (LNG) tank.

\* \* \* \* \*